United States Patent
Yoshida et al.

(10) Patent No.: US 6,997,276 B2
(45) Date of Patent: Feb. 14, 2006

(54) SUBFRAME MOUNT STRUCTURE

(75) Inventors: Hiroyuki Yoshida, Wako (JP); Yasushi Okamoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 169 days.

(21) Appl. No.: 10/648,130

(22) Filed: Aug. 26, 2003

(65) Prior Publication Data

US 2004/0046381 A1    Mar. 11, 2004

(30) Foreign Application Priority Data

Sep. 6, 2002    (JP) .............................. 2002-262005

(51) Int. Cl.
  *B60K 5/00* (2006.01)
  *B62D 21/15* (2006.01)
(52) U.S. Cl. ............... 180/232; 180/312; 280/124.109; 280/784; 280/788
(58) Field of Classification Search ............... 180/232, 180/312; 280/124.109, 784, 788
See application file for complete search history.

(56) References Cited

U.S. PATENT DOCUMENTS

| | | | | |
|---|---|---|---|---|
| 3,869,017 A | * | 3/1975 | Feustel et al. ............... | 180/232 |
| 4,266,630 A | * | 5/1981 | Nilsson et al. ............... | 180/291 |
| 4,440,435 A | * | 4/1984 | Norlin .................... | 296/187.09 |
| 4,531,761 A | * | 7/1985 | von Sivers .................. | 280/785 |
| 5,074,374 A | * | 12/1991 | Ohtake et al. ............... | 180/312 |
| 5,560,651 A | * | 10/1996 | Kami et al. .................. | 280/788 |
| 6,109,629 A | * | 8/2000 | Bortz et al. ........... | 280/124.109 |
| 6,109,654 A | | 8/2000 | Yamamoto et al. | |
| 6,120,060 A | * | 9/2000 | Kocer et al. ................. | 280/788 |
| 6,193,274 B1 | * | 2/2001 | Brown et al. ............... | 280/784 |
| 6,511,096 B1 | * | 1/2003 | Kunert et al. ............... | 280/785 |

FOREIGN PATENT DOCUMENTS

| | | |
|---|---|---|
| DE | 33 45 171 | 7/1984 |
| DE | 41 34 267 | 4/1992 |
| DE | 199 20 051 | 11/2000 |
| GB | 2 329 877 | 4/1999 |
| JP | 52-11717 | 1/1977 |

* cited by examiner

*Primary Examiner*—Paul N. Dickson
*Assistant Examiner*—George D. Spisich
(74) *Attorney, Agent, or Firm*—Hamre, Schumann, Mueller & Larson, P.C.

(57) ABSTRACT

A subframe 1 is mounted on a vehicle body (body side frame 2) through mounts (subframe mounts B1–B6) with elastic bodies (rubber members 6, 7, 11), at two points located on both sides in lateral directions of a front portion of the subframe, at two points located on both sides in lateral directions of a middle portion thereof near a location where a suspension link is attached to the subframe 1, and at two points located on both sides in lateral directions of a rear portion thereof. The mounts at the points located on the both sides in lateral directions of the middle portion of the subframe each have a fracture stress upon crash smaller than that which the mounts at the points located on the both sides in lateral directions of at least one of the front and rear portions of the subframe 1 have. This subframe mount structure serves to mitigate damage of a passenger caused on collision of the vehicle to protect the passenger.

19 Claims, 4 Drawing Sheets

SUBFRAME MOUNT STRUCTURE

BACKGROUND OF THE INVENTION

This invention relates to a subframe mount structure which utilizes a crashproof detachable mechanism in a joint portion (or mount) where the subframe for a vehicle is mounted in a vehicle body, to improve a passenger protection capability of the vehicle.

Various techniques have been proposed to increase a crashable stroke so as to obtain improved energy absorption of crashing loads applied on collision of the vehicle, thereby preventing a vehicle's interior from deforming due to rearward displacement of a front frame of the subframe caused by impact of the collision.

Among such techniques is a subframe-fastening structure for a vehicle in which a bolted joint portion between a subframe for supporting a suspension arm and a vehicle body is ruptured to separate the subframe from the vehicle body, which is disclosed, for example, in Japanese Laid-Open Utility Model Application, Publication No. 52-11717.

Several means for absorbing energy of crashing loads applied on collision of a vehicle are known in the art, and include "sliding separable structure" having a subframe allowed to slide across a vehicle body when a collision occurs, and "breaking separable structure" having a subframe allowed to be partially broken so as to separate the subframe from the vehicle body. Two varieties of subframe mount structures are available to which the "sliding separable structure" and "breaking separable structure" may be applied: one is the four-point support system in which four joint points (spots) of a subframe are supported on a vehicle body and two joint points (spots) thereof are to be separated on collision; and the other is the six-point support system in which six joint points (spots) of a subframe are supported on a vehicle body and two joint points (spots) thereof are to be separated on collision.

Bolts and nuts used in the subframe-fastening structure for a vehicle as disclosed in the above publication, however, have a floating support structure using a rubber vibration isolator, which allows the subframe to float on the vehicle body, for the purpose of improving marketability of the vehicle in view of noise and vibration insulation. From a double-safety standpoint, i.e., for preventing an engine of the vehicle from falling off when collision occurs, the subframe-fastening structure using bolts and nuts is designed to prevent a fall of the engine, which would otherwise result from rupture of the rubber vibration isolator caused by crash associated with collision of the vehicle. This engine falling prevention functionality would disadvantageously inhibit separation of the vehicle body and the subframe, and mar a desirable failure mode according to which the vehicle body should be destroyed on collision.

When a relatively large subframe, e.g., a subframe for a double wishbone suspension, is supported with a subframe mount structure having the aforementioned six-point support system where six joint points of the subframe are supported on the vehicle body, in order to increase a crashable stroke on collision, many joint points, particularly, more than two joint points except for two fundamental joint points, of the subframe should be ruptured stably without fail to allow the subframe to separate from the vehicle body.

When many joint points of the subframe at which the subframe is mounted on the vehicle body are ruptured so that the subframe is separated from the vehicle body, the separation caused by collision of the vehicle progresses stepwise, i.e., several incidents of separation take place at intervals, thus intermittently producing an action tending to stop an inertial force of the collision. Accordingly, each time when the joint point of the subframe is ruptured to allow the subframe to be separated from the vehicle body, a force that stops the inertial force is transmitted directly to a passenger and acts as an impact on the passenger. Therefore, with consideration given to an adverse effect of the impacts on the passenger, it is desired that each joint point be ruptured with a relatively stable (unvarying) load.

The present invention is made to address the above-described disadvantages in the existing techniques, and it is an exemplary object of the present invention to provide a subframe mount structure that can mitigate damage of a passenger caused on collision of the vehicle to protect the passenger.

SUMMARY OF THE INVENTION

According to one exemplary aspect of the present invention, there is provided a subframe mount structure, in which a subframe is mounted on a vehicle body through mounts with elastic bodies, at two points located on both sides in lateral directions of a front portion of the subframe, at two points located on both sides in lateral directions of a middle portion thereof near a location where a suspension link is attached to the subframe, and at two points located on both sides in lateral directions of a rear portion thereof. The mounts at the points located on the both sides in lateral directions of the middle portion of the subframe each have a fracture stress upon crash smaller than that which the mounts at the points located on the both sides in lateral directions of at least one of the front and rear portions of the subframe have.

Hereupon, the terms "front", "middle" and "rear" are used to represent relative positions on the subframe with respect to the vehicle body. Similarly, the term "lateral directions" is used to represent a widthwise/transverse directions with respect to the vehicle body, so that the "both sides" denote the right and left positions on the subframe with respect to the vehicle body.

With this construction, among the mounts at the six points of the subframe, those located on the middle portion of the subframe can be ruptured and separated with a relatively lower load, while those located on the other portions (front and/or rear portions) can be ruptured and separated with a relatively higher load, when the vehicle is crashed by collision. Therefore, the action for receiving an inertial force of collision is reduced at the points located on the middle portion of the subframe, so that an impact caused when the mounts located at the points on the middle portion are ruptured can be reduced. Particularly, when the fracture stress of the mounts located at the points on the rear portion is greater than those of the mounts located at the other points, especially on the middle portion, the inertial force of collision can be received at the points located on the rear portion, so that an impact on the passengers can be reduced.

In a subframe mount structure according to another aspect of the present invention, a subframe which a linkage for one of a suspension and a power unit is attached to is mounted on a vehicle body through mounts with elastic bodies, at four or more points among which two points are located on both sides in lateral directions of a front portion of the subframe, and two points are located on both sides in lateral directions of a rear portion of the subframe; and the mounts at the points located on the both sides in lateral directions of one of the front and rear portions of the subframe each have a fracture stress upon crash greater than that which the mounts at the points located on the both sides in lateral directions of another portion of the subframe have.

With this construction, for example, among the mounts at the four points of the subframe, those located on a first portion (one of the front and rear portions) of the subframe can be ruptured and separated with a relatively higher load, while those located on a second portion (the other of the front and rear portions) and/or other portions (i.e., middle portion) can be ruptured and separated with a relatively lower load, when the vehicle is crashed by collision. Therefore, the action for receiving an inertial force of collision is reduced at the points located on the above second portion and/or other portions of the subframe, so that an impact caused when the mounts located at the points on the second portion are ruptured can be reduced. Particularly, when the fracture stress of the mounts located at the points on the rear portion is greater than those of the mounts located at the other points on the front portion, the inertial force of collision can be received at the points located on the rear portion, so that an impact on the passengers can be minimized.

According to yet another aspect of the present invention, a subframe mount structure, in which a subframe which a linkage for one of a suspension and a power unit is attached to is mounted on a vehicle body through mounts with elastic bodies, at four or more points among which two points are located on both sides in lateral directions of a front portion of the subframe, and two points are located on both sides in lateral directions of a rear portion of the subframe. Each of the mounts at the points located on the both sides in lateral directions of one of the front and rear portions of the subframe includes an internal tube arranged in an orientation such that an axis thereof extends in a vertical direction and fastened with a bolt to the vehicle body, an external tube enclosing the internal tube and attached to the subframe, and an elastic body provided in a space between the internal tube and the external tube. On the other hand, each of the mounts at the points located on both sides in lateral directions of another portion of the subframe includes a first member attached to the vehicle body, a second member attached to the subframe, and an elastic body provided in a space extending in front/rear directions of the vehicle body between the first and second members. Alternatively, each of the mounts at the points located on both sides in lateral directions of another portion of the subframe includes a first member attached to the vehicle body, a second member attached to the subframe, and an elastic body provided between the first and second members, whereas at least one of the first and second members may be attached with a bolt, and a bolt-fastened portion thereof has a cutaway portion.

In the above construction, each mount at the points located on the both sides in lateral directions of a first portion (one of the front and rear portions) of the subframe has a fracture stress upon crash greater than that which each mount at the points located on the both sides in lateral directions of a second portion (the other of the front and rear portions) and/or other portions has, and the mount at the points located on the second portion can be ruptured and separated with relative ease. To be more specific, in the second portion, the elastic body provided in a space extending in front/rear directions of the vehicle body between the first and second members has no restrictions on excessive deformation, and thus can be easily ruptured so that the subframe and the vehicle body can be separated easily at the points located on the second portion, when a load derived from collision of the vehicle is applied to the first and second members attached respectively to the vehicle body and the subframe.

In the above subframe mount structure, preferably, the portion (second portion) including the first and second members and the elastic member is near a location where the linkage is attached to the subframe. In the alternative arrangement in which each of the mounts at the points located on both sides in lateral directions of another portion of the subframe includes a first member attached to the vehicle body, a second member attached to the subframe, and an elastic body provided between the first and second members, whereas at least one of the first and second members may be attached with a bolt, and a bolt-fastened portion thereof has a cutaway portion, the bolt may preferably be disengageable out of a bolt hole through the cutaway portion contiguous with the bolt hole in one of vertical and horizontal directions.

With this construction, when a load, particularly in front/rear directions, caused by collision of the vehicle is applied to the portion(s) including the first and the second members and the elastic member, the elastic body is bent and ruptured so that the first member attached to the vehicle body and the second member attached to the subframe are separated from each other, and the bolt is likely to be slid and disengaged from the bolt-fastened portion through the cutaway portion in the vertical or horizontal (frontward/rearward) direction. Consequently, the power unit can be dropped without fail, and the impact on the passengers applied when the second portion is ruptured can be considerably reduced.

Other objects and further features of the present invention will become readily apparent from the following description of preferred embodiments with reference to accompanying drawings.

DETAILED DESCRIPTION OF THE PREFERRED EMBODIMENTS

A detailed description will be given of one exemplified embodiment of a subframe mount structure according to the present invention, first, with reference to FIGS. 1 and 2.

Figure 1:
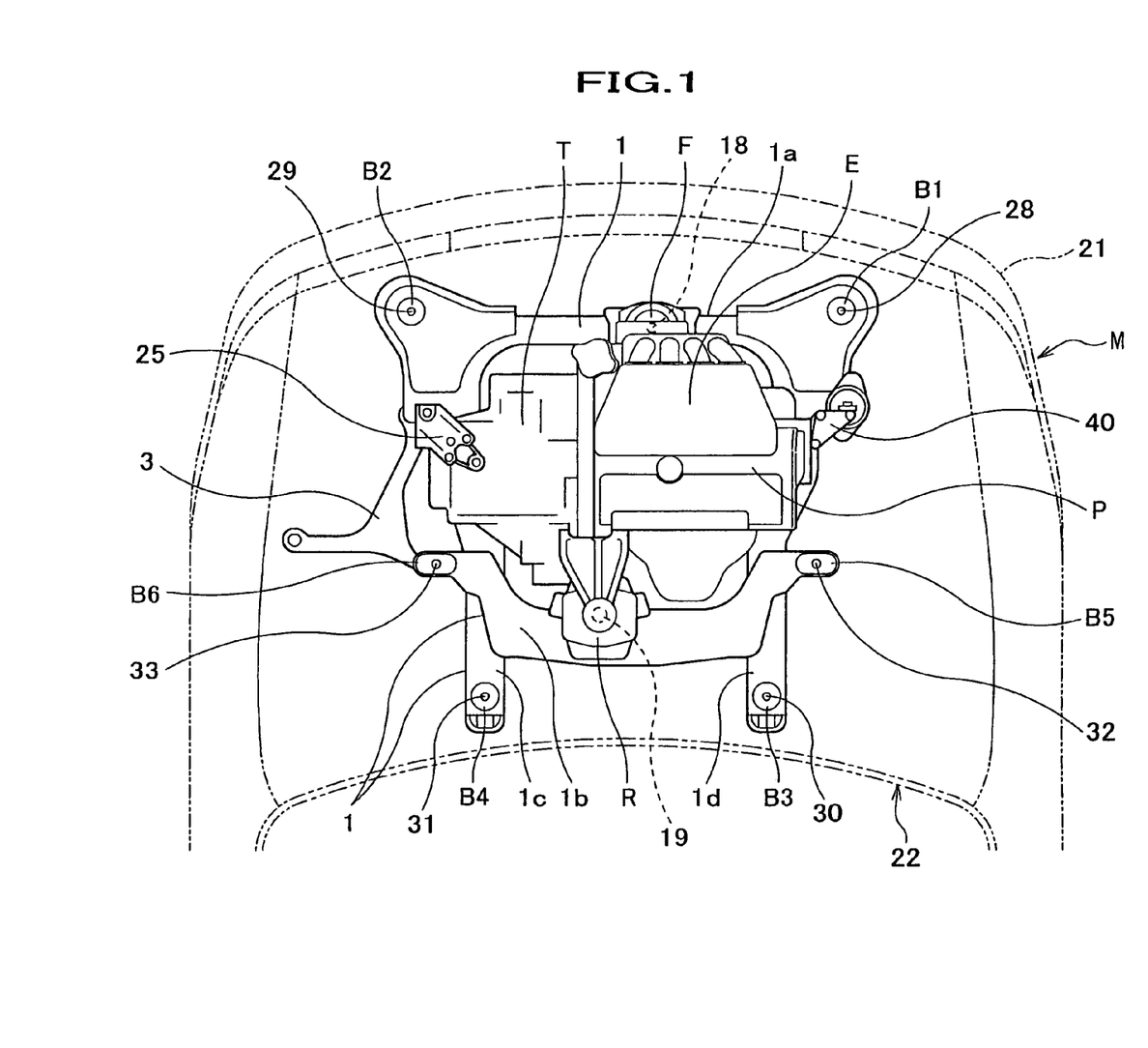
FIG. 1 is a plan view showing a principal portion of a subframe mount structure according to one exemplified embodiment of the present invention.
Figure 2:
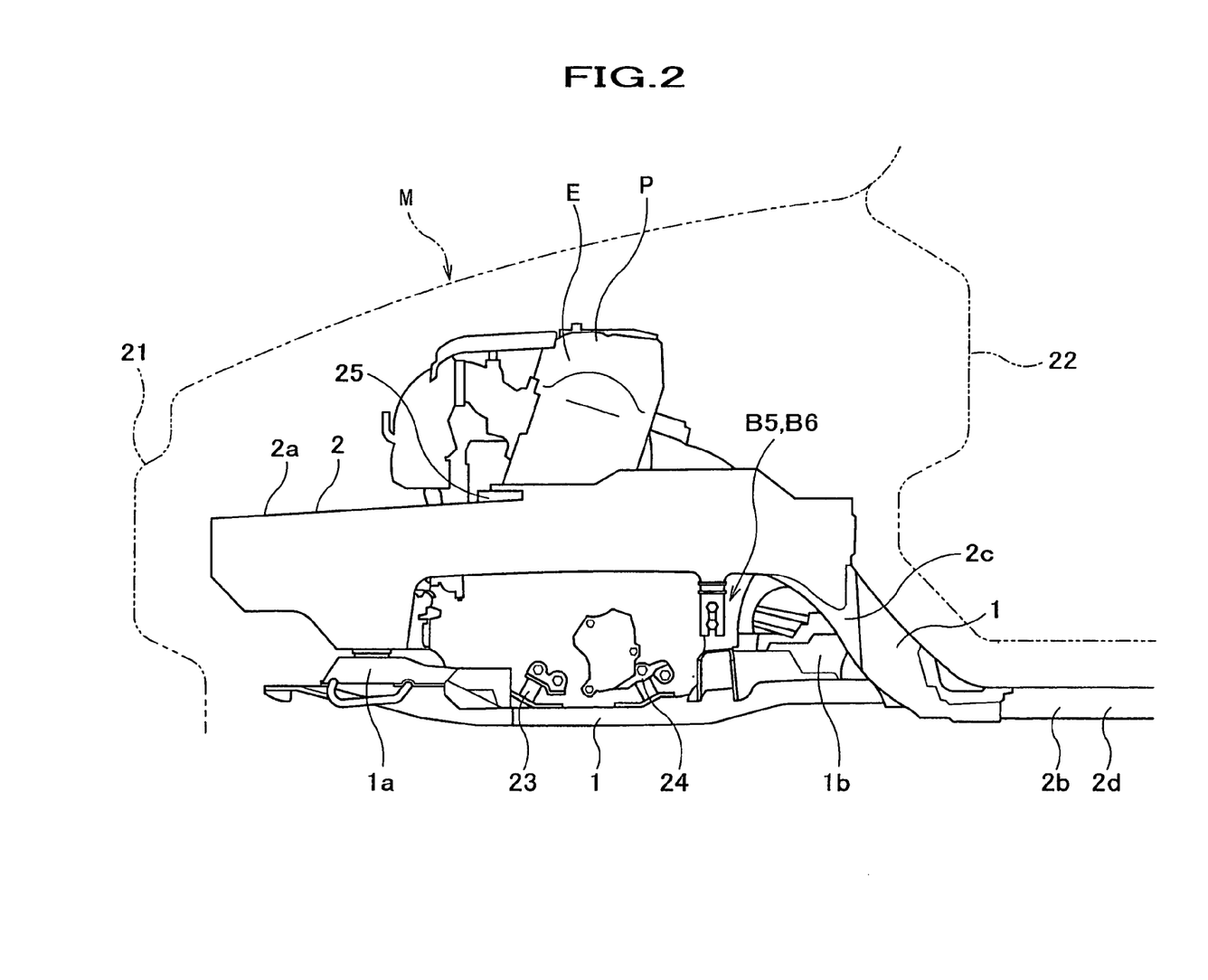
FIG. 2 is a side elevation showing a principal portion of the subframe mount structure of FIG. 1.

As shown in FIGS. 1 and 2, a vehicle M includes a subframe 1 installed in a front portion of a vehicle body where a hood is located, and a subframe (not shown) installed in a rear portion of the vehicle body where a rear trunk is located. The subframes in front and rear portions of the vehicle body are frames that may be referred to as suspension members in that they support a suspension (not shown), and are elastically supported on a body side frame 2.

The subframe 1 in the front portion is also called front subframe, and includes a left side member 1c, a right side member 1d, a front cross member 1a, and a rear cross member 1b, which are arranged in parallel crosses (and shaped into a curb) as viewed from a top thereof, and combined together by welding or the like. The left side member 1c of the subframe 1 extends in front/rear directions of the vehicle M at a left side of a power unit P, while the right side member 1d of the subframe 1 extends in the front/rear directions of the vehicle M at a right side of the power unit P. The front cross member 1a of the subframe 1 extends in lateral (widthwise or transverse) directions of the vehicle M at a front side of the power unit P, while the rear cross member 1b of the subframe 1 extends in the lateral directions of the vehicle M at a rear side of the power unit P. The power unit P is comprised of an engine E and a transmission T, which are combined in an integral unit. The power unit P is attached to the frame body of the curb-shaped subframe 1. The subframe 1 is supported such that the power unit P attached to the subframe 1 can be detached and fall by a load caused by an impact of the collision of the vehicle M with the help of its own weight, when a collision occurs.

The subframe 1 supports the power unit P in such a manner that the power unit P is floated on a side engine mount 40 of the right side member 1d for supporting the engine E, a front mount 18 of the front cross member 1a, a rear mount 19 of the rear cross member 1b, and a transmission lower mounts 23, 24.

The subframe 1 also supports a suspension arm 3 to which a suspension link (not shown) is attached and a transmission upper mount 25 in such a manner that the suspension arm 3 and the transmission upper mount 25 are floated on rubber isolators (not shown). The transmission upper mount 25 and the side engine mount 40 are disposed substantially symmetrically with respect to the power unit P, to support the power unit P. The subframe 1 is fastened to the body side frame 2 through subframe mounts B1–B6 with bolts 28–33, at six points on both sides in lateral directions of front, rear and middle portions of the subframe 1. The subframe mounts B1–B6 each have a rubber isolator, to absorb vibration and prevents its transmission to the body side frame 2.

As shown in FIG. 2, on the subframe 1, at a front upper side of the vehicle M is provided a radiator (not shown), at a front side of the vehicle M is provided a bumper 21, and at a rear side of the vehicle M is provided a dashboard 22.

The body side frame 2 includes a side frame 2a provided in the midsection of the power unit P as viewed from sideward, and a side sill 2b provided contiguously at the lower end of the side frame 2a. The side sill 2b, together with a tilt portion 2c tilting down from the side frame 2a, is formed at a lower section of the dashboard 22 in such a manner as to be contiguous to the tilt portion 2c, and is provided in a horizontal position having the same height as the position of the subframe 1.

The framework constituted of the side frame 2a, side sill 2b and subframe 1 is in a substantially trapezoidal shape having horizontally extending parallel sides of which the lower (bottom or base) is longer than the upper as viewed from sideward, as shown in FIG. 2. The power unit P is placed on the base of the trapezoidal framework in such a position that the center of gravity of the power unit P is low relative to the body side frame 2, allowing the power unit P can easily drop with the help of its self weight, when a collision occurs.

Figure 3:
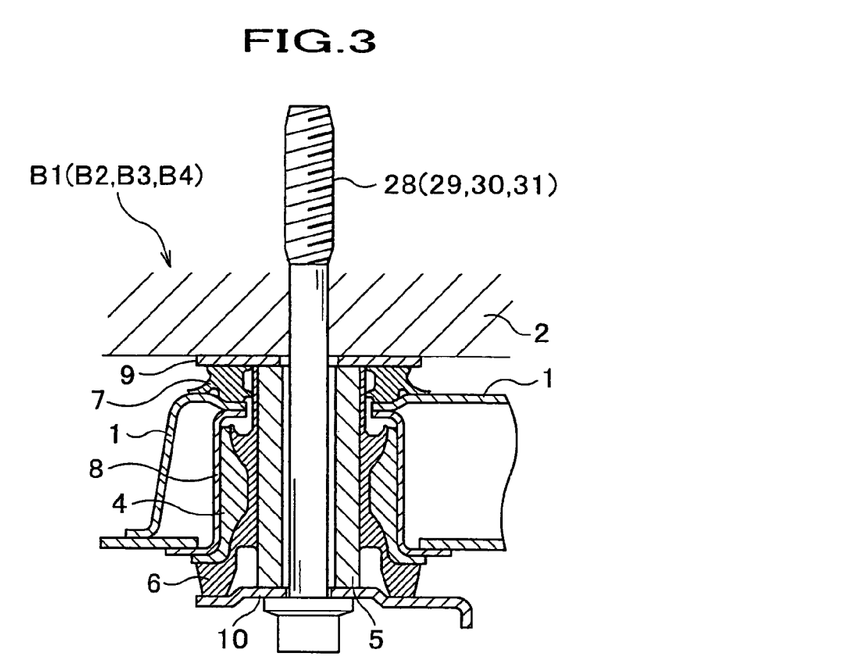
FIG. 3 is an enlarged cross section partially showing a mount at points located on both sides in lateral directions of a front or rear portion of a subframe.

FIG. 3 is an enlarged cross-sectional view partially showing a mount at points located on both sides in lateral directions of the front or rear portion of the subframe according one embodiment of the present invention.

Subframe mounts B1–B4 at points on the front and rear portions of the subframe 1 have the same constructions as illustrated in FIG. 3. The subframe mount B1 (B2, B3, B4) includes an external tube 4, an internal tube 5, rubber members 6, 7, a holder 8, and stays 9, 10, so as to fasten the subframe 1 and the body side frame 2 together. Around the internal tube 5 into which a collared bolt 28 (29, 30, 31) is fitted, the rubber member 6 is fitted and fixed with an adhesive or the like. Around the rubber member 6, the external tube 4 is fitted and fixed with an adhesive or the like. The external tube 4 is fitted into the collared tubular holder 8. As described above, within the holder 8, the external tube 4 having a swelling at a middle section of an inside surface thereof, the rubber member 6 and the internal tube 5 are fitted, and the holder 8 having these components is fitted into an opening of the subframe 1.

When the subframe 1 is fastened on the body side frame 2 with the bolt 28 (29, 30, 31), the bolt 28 (29, 30, 31) is inserted through the stay 10 into the internal tube 5, and screwed through the rubber member 7 (as a rubber isolator) and the stay 9 into the body side frame 2.

Accordingly, even if the rubber members 6, 7 of the subframe mounts B1–B4 are ruptured, the external tube 4 and the subframe 1 serve to restrict relative shifts in front/rear directions (i.e., radial directions of the internal tube 5), and the body side frame 2 and the stay 10 serve to restrict relative shifts in vertical directions. Therefore, unless these restrictive components would be ruptured, the subframe could never be separated from the body side frame 2.

Figure 4:
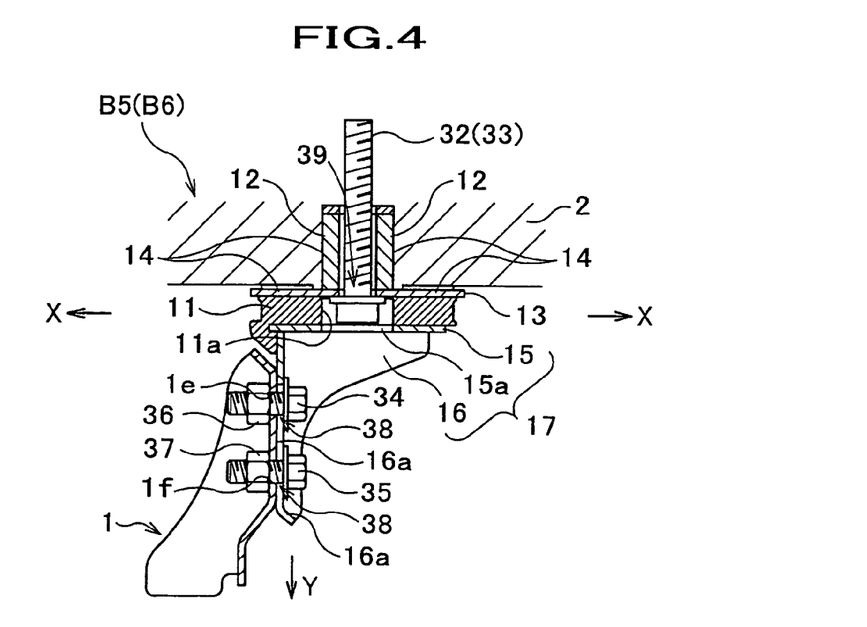
FIG. 4 is an enlarged cross section partially showing a mount at points located on both sides in lateral directions of a middle portion of the subframe.
Figure 5:
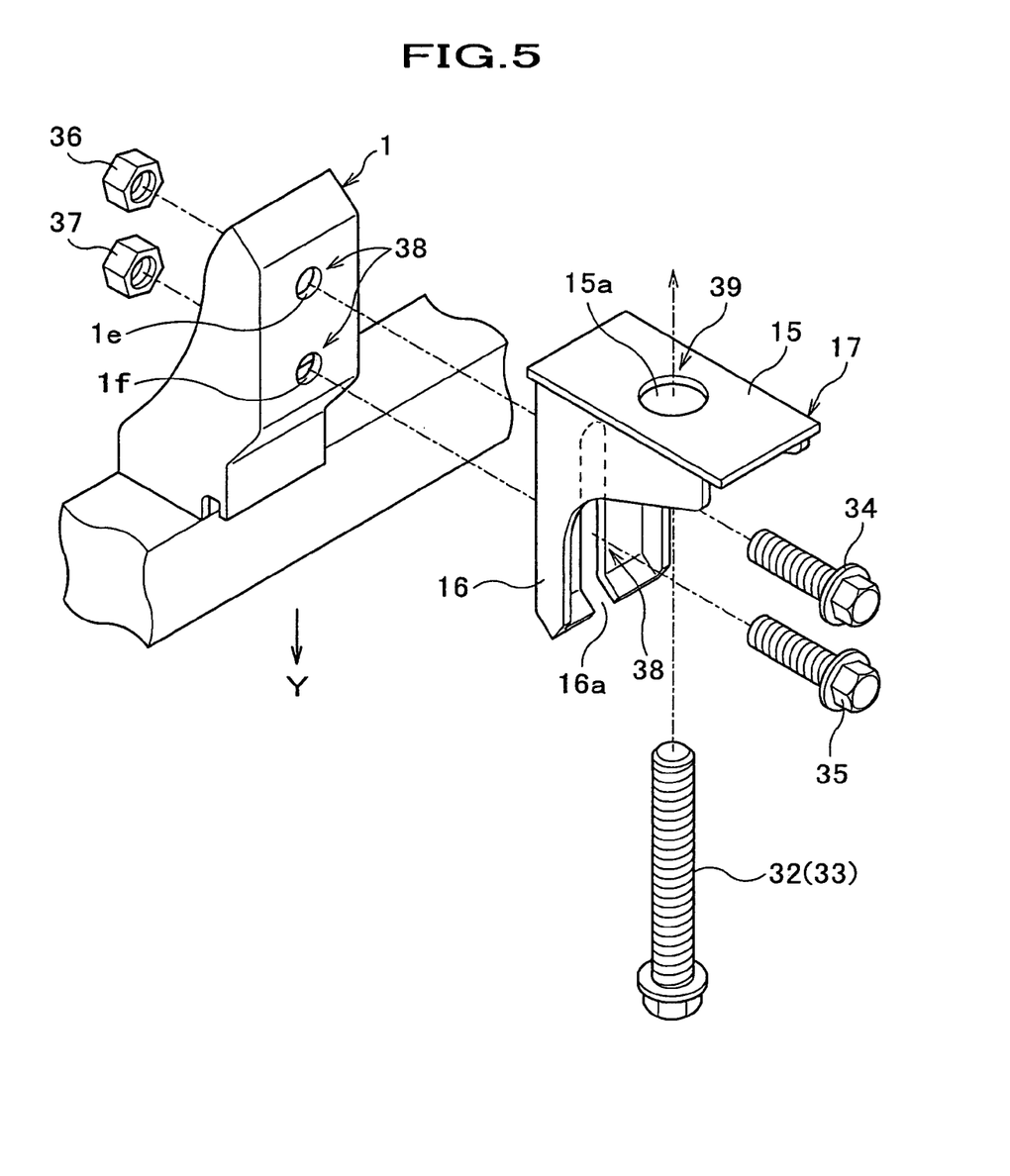
FIG. 5 is an exploded perspective view of a bolt-fastened portion for schematically showing the subframe mount structure according to one exemplified embodiment of the present invention.

FIG. 4 is an enlarged cross-sectional view partially showing a mount at points located on both sides in lateral directions of the middle portion of the subframe according to one embodiment of the present invention. FIG. 5 is an exploded perspective view of a bolt-fastened portion for schematically showing the subframe mount structure according to this embodiment of the present invention.

The subframe mounts B5, B6 illustrated in FIGS. 4 and 5 are structurally different from the subframe mounts B1–B4. As shown in FIG. 4, the subframe mount B5 (B6) is comprised of upper mounting hardware 14 and lower mounting hardware 17 fixed together, with a rubber member 11 interposed therebetween. The rubber member 11 is provided in a space extending in front/rear directions of the vehicle body between the upper mounting hardware 14 and the lower mounting hardware 17. The upper mounting hardware 14 is fastened with a bolt 32 (33) to the body side frame 2, while the lower mounting hardware 17 is fastened with bolts 34, 35 to the subframe 1.

A bolt-fastened portion 39 of the subframe mount B5 (B6) is fastened to the body side frame 2 from a bottom side of the rubber member 11 through an opening 11a thereof with the collared bolt 32, with clearance allowed between the collared bolt 32 and the rubber member 11 in the opening 11a.

The upper mounting hardware 14 is comprised of a tubular metal collar 12 through which a threaded portion of the bolt 32 is screwed in, and an upper plate 13 made of metal which is fixed on a top face of the rubber member 11 and constitutes a strike plate for receiving the bolt 32. The collar 12 and the upper plate 13 are integrally formed in one piece by welding.

The lower mounting hardware 17 is comprised of a low plate 15 made of metal which is fixed on a bottom face of the rubber member 11 and provided with a hole 15*a* through which a head of the bolt 32 is inserted, and a tabular metal bracket 16 which is provided with a bolt-fastened portion 38 for bolts 34, 35 such that the bolt-fastened portion 38 projects downward from the low plate 15. The low plate 15 and the bracket 16 are integrally formed in one piece by welding.

The rubber member 11 serving as a vibration isolator and shock absorber for the subframe mount B5 (B6) joins the upper mounting hardware 14 having the collar 12 and the upper plate 13 welded together and the lower mounting hardware 17 comprised of the low plate 15 and the bracket 16 that are welded together, in such a manner that a bottom face of the upper plate 13 of the upper mounting hardware 14 is fixed on the top face of the rubber member 11 and a top face of the low plate 15 of the lower mounting hardware 17 is fixed on the bottom face of the rubber 11, so that the subframe mount B5 (B6) are integrally formed in one piece. In a midsection of the rubber 11 is formed a hollow opening 11*a* in which the head of the bolt 32 is accommodated, and in horizontal directions thereof is placed no other component.

As shown in FIG. 5, the bracket 16 includes a cutaway portion 16*a* in the form of a U-shaped groove having an opening oriented downward. The subframe mount B5 (B6) is fastened to the subframe 1 with the collared bolts 34, 35 by inserting the bolts 34, 35 in the transverse direction of the vehicle M through the cutaway portion 16*a*, screw holes 1*e*, 1*f* and hexagon nuts 36, 37 (for which nuts with collars may preferably be employed, though not illustrated).

According to the mount structure in which the subframe 1 is fastened to the body side frame 2, the downward opening of the cutaway portion 16*a* of the bracket 16 formed contiguously with bolt holes thereof through which the bolts 34, 35 are inserted allows the subframe 1 to relatively slide when an external force is applied in a downward direction (as indicated by an arrow Y) toward the opening of the cutaway portion 16*a*, and thereby the subframe 1 is separated from the body side frame 2. Moreover, the body side frame 2 and the subframe 1 are joined together through the mount B5 (B6) having the upper mounting hardware 14 and the lower mounting hardware 17 connected by the rubber member 11, and thus the rubber member 11 comes off when an external force is applied from front/rear directions (as indicated by arrows X) to the upper mounting hardware 14 and the lower mounting hardware 17, thereby the subframe is separated from the body side frame 2.

Hereupon, the above rubber members 6, 7 and 11 are not restricted by material, but any elastic body, including those made of material other than rubber may be employed. It is understood that the upper mounting hardware 14 and the lower mounting hardware 17 exemplified in this embodiment correspond to elements in claims as designated in the summary of the invention respectively by a first member attached to the vehicle body and a second member attached to the subframe.

Next, a description will be given of an action and operation of the subframe mount structure according to the present invention as exemplified in the above described embodiment.

Assuming that a vehicle M collides head-on against an impediment with a load applied approximately uniformly along the width of the front of the vehicle M, first, a bumper 21 is pressed and crashed, and then the right and left body side frames 2 are pressed and crashed evenly. A front cross member 1*a* of the subframe 1 moves toward the dashboard 22 and pushes the engine E rearward, without being separated from the body side frames 2.

Subsequently, a load caused by the collision is applied to the subframe mounts B5, B6, and the subframe mounts B5, B6 are ruptured. At this stage, the subframe mounts B5, B6 located on both sides in lateral directions of a middle portion of the subframe 1 have a fracture stress upon crash smaller than that which the subframe mounts B1–B4 located on both sides in lateral directions of the front and rear portions of the subframe 1 have, and may therefore be ruptured and separated with a relatively small load. On the other hand, the other subframe mounts B1–B4 located on the both sides in lateral directions of the front and rear portions of the subframe 1 may be separated with a relatively large load in comparison with the subframe mounts B5, B6. Accordingly, the action for receiving an inertial force of collision is reduced at the subframe mounts B5, B6 located on the middle portion of the subframe 1, so that an impact on passengers caused when the subframe mounts B5, B6 located on the middle portion are ruptured can be reduced.

Since the subframe mounts B5, B6 located on the middle portion of the subframe 1, as described above, have a fracture stress upon crash smaller than that which the subframe mounts B1–B4 on the middle portion of the subframe 1 have, when a load of collision is applied to the subframe 1, the subframe mounts B5, B6 are ruptured first, and the subframe 1 is separated from the body side frame 2. When the subframe mounts B5, B6 are ruptured, change in speed caused by collision of the vehicle M decreases smoothly because the subframe 1 separated from the body side frame 2 slidingly moves, so that damage which a passenger would suffer can be eliminated.

At that time, the subframe mount structure according to this embodiment in which the upper mounting hardware 14 fastened to the body side frame 2 with a bolt 32 (33) and the lower mounting hardware 17 fastened to the subframe 1 with bolts 34, 35 are attached together only through the rubber member 11 allows the upper and lower mounting hardware 14, 17 to be easily separated from each other with a relatively small load as a result of peeling of the rubber member 11, and the subframe 1 to slide in front/rear directions (indicated by arrows X).

Moreover, the bolt-fastened portion 38 in the upper mounting hardware 14 and the lower mounting hardware 17, when receiving a load in vertical directions, can be separated by allowing the bolts 34, 35 fastened to the subframe 1 to slide downwardly (in a direction indicated by an arrow Y) out of the lower mounting hardware 17 through the cutaway portion 16*a* provided thereof, thereby separating the subframe 1 from the body side frame 2 smoothly so that the power unit P can be allowed to drop.

It is to be understood that the separation of the upper mounting hardware 14 and the lower mounting hardware 17 resulting from the rupture of the rubber member 11 and the separation of the subframe 1 with the bolts 34, 35 from the lower mounting hardware 17 can progress at the same time.

With the above structure in which the body side frame 2 and the subframe 1 are separated from each other, separation can progress stably without fail with a considerably small load in comparison with separation by rupture of a body construction made of a steel sheet member as in conventional structures.

With the above structure in which the subframe 1 with the bolts 34, 35 is slid out of the lower mounting hardware 17 through the cutaway portion 16a thereof, since the upper mounting hardware 14 and the lower mounting hardware 17 are connected only through the rubber member 11, a stress can be applied stably without fail in a direction in which the bolts 34, 35 may be slid out, so that the subframe 1 can be separated from the bracket 16 with the help of the normally downward-oriented opening of cutaway portion 16a provided contiguously with the bolt holes, as the opening is allowed to tilt frontward or rearward because the rubber member 11 may bend in a relatively wide range in front and rear directions (as indicated by arrows Y).

As described above, when a collision occurs, first, the subframe mounts B5, B6 located on the both sides in lateral directions of the middle portion are ruptured, and next, when the subframe 1 moves to a position immediately before the dashboard 22 where the subframe mounts B3, B4 located on the both sides in lateral directions of the rear portion of the subframe 1 are provided, the subframe mounts B3, B4 each having a relatively great fracture stress are ruptured, with the result that the power unit P and the subframe 1 drop with the help of its self weight. Consequently, the dashboard 22 is prevented from deforming by a thrusting force of the power unit P, whereby an impact on the passengers can be reduced.

Although the preferred embodiments of the present invention have been described above, various modifications and changes may be made in the present invention without departing from the spirit and scope thereof.

For example, it should be understood that the engine E of the power unit P broadly covers a variety of power sources for driving a motor vehicle.

The subframe mounts B1-B6 are not limited to those fastened with bolts 28–35 and nuts 36, 37, etc., but any other fastening members may be employed to hold the subframe 1 and the body side frame 2. Though the subframe mounts B1–B6 are provided at six points to hold the subframe 1 and the body side frame 2 in the above embodiment, the subframe mounts may be provided at four points where the subframe mounts B1, B2 are located on the both sides in lateral directions of the front portion of the subframe 1 and the subframe mounts B5, B6 are located on the both sides in lateral directions of the rear portion of the subframe 1.

The cutaway portion 16a which is provided in the bolt-fastened portion 38 of the bracket 16 in the lower mounting hardware 17 according to the present embodiment as shown in FIG. 4 may alternatively be provided in the subframe 1, and the bolt holes 1e and 1f which are provided in the subframe 1 may thus be provided in the bracket 16. This construction may exert the same advantageous effects as in the illustrated embodiment. The cutaway portion 16a may be applied to the bolt-fastened portion 39 provided in the upper mounting hardware 14, and the bolt 32 (33) may be adapted to be disengageable out of a bolt hole through a cutaway portion contiguous with the bolt hole in the horizontal (preferably front/rear) directions, in contrast with the above embodiment in which the bolts 34, 35 are disengageable out of the bolt hole (bolt-fastened portion 38) through the cutaway portion 16a contiguous with the bolt hole in the vertical directions.

The rubber members 6, 7, 11 may be substituted with any other elastic bodies made of material such as synthetic resin, synthetic rubber and the like.

Further, the present invention is not limited to the embodiment as described above in which the subframe 1 mounted using the inventive mount structure is installed in the front portion of the vehicle M where the hood is located. Rather, a subframe (not shown) installed in the rear portion of the vehicle M where the rear trunk is located may include the inventive mount structure so that the advantages of the present invention may also be exerted when a collision from the rear of the vehicle M occurs.

What is claimed is:

1. A subframe mount structure, wherein a subframe is mounted on a vehicle body through mounts with elastic bodies, at two points located on both sides in lateral directions of a front portion of the subframe, at two points located on both sides in lateral directions of a middle portion thereof near a location where a suspension link is attached to the subframe, and at two points located on both sides in lateral directions of a rear portion thereof; and wherein the mounts at the points located on the both sides in lateral directions of the middle portion of the subframe each have a fracture stress upon crash smaller than that which the mounts at the points located on the both sides in lateral directions of at least one of the front and rear portions of the subframe have.

2. A subframe mount structure, wherein a subframe which a linkage for one of a suspension and a power unit is attached to is mounted on a vehicle body through mounts with elastic bodies at four or more points among which two points are located on both sides in lateral directions of a first portion of the subframe, and two points are located on both sides in lateral directions of a second portion of the subframe the first and second portions of the subframe being spaced from each other in a front/rear direction of the vehicle body; and wherein the mounts at the points located on the both sides in lateral directions of one of the first and second portions of the subframe each have a fracture stress upon crash greater than that which the mounts at the points located on the both sides in lateral directions of the other of the first and second portions of the subframe have;

wherein those mounts having a lower fracture stress upon crash include first and second members attached to the vehicle body and the subframe, respectively, and an elastic body coupled between the first and second members, and at least one of the first and second members is detachable from the respective vehicle body and subframe or from the elastic body upon crash without failure of the first and second members.

3. A subframe mount structure, wherein a subframe which a linkage for one of a suspension and a power unit is attached to is mounted on a vehicle body through mounts with elastic bodies at four or more points among which a first pair of the points are located on both sides in lateral directions of a first portion of the subframe, and a second pair of the points are located on both sides in lateral directions of a second portion of the subframe, the first and second portions of the subframe being spaced from each other in a front/rear direction of the vehicle body; and wherein each of the mounts of one of the first pair and the second pair of points includes an internal tube arranged in an orientation such that an axis thereof extends in a vertical direction and fastened with a bolt to the vehicle body, an external tube enclosing the internal tube and attached to the subframe, and an elastic body provided in a space between the internal tube and the external tube; and wherein each of the mounts at the points located on both sides in lateral directions of the other of the first and second portions of the subframe includes a first member attached to the vehicle body, a second member directly attached to the subframe, and an elastic body provided in a space extending in the front/rear direction of the vehicle body between the first and second members.

4. A subframe mount structure according to claim 3, wherein the portion including the first and second members and the elastic body is near a location where the linkage is attached to the subframe.

5. A subframe mount structure according to claim 3, wherein at least one of the first and second members is attached with a bolt, and a bolt-fastened portion thereof has a bolt hale and a cutaway portion contiguous with the bolt hole and that extends to a side edge of the bolt-fastened portion.

6. A subframe mount structure according to claim 5, wherein the bolt is disengageable out of the bolt hole through the cutaway portion in one of vertical and horizontal directions.

7. A subframe mount structure according to claim 3, wherein the mounts at the first pair of points each include said internal tube, said external tube and said elastic body; and wherein the mounts at the second pair of points each include said first member, said second member and said elastic body.

8. A subframe mount structure according to claim 3, wherein the mounts at the first pair of the points each have a fracture stress upon crash greater than that which the mounts at the second pair of points have.

9. A subframe mount structure according to claim 3, further comprising mounts at a third pair of points located on both sides in lateral directions of the subframe, wherein the mounts at the third pair of points each include an internal tube arranged in an orientation such that an axis thereof extends in a vertical direction and fastened with a bolt to the vehicle body, an external tube enclosing the internal tube and attached to the subframe, and an elastic body provided in a space between the internal tube and the external tube.

10. A subframe mount structure according to claim 9, wherein the second pair of points is located between the first and third pairs of points in the front/rear direction of the vehicle body, and wherein the pairs of points are arranged according to one of the following:
   a) the first pair of points is located forward of the second pair of points, and the second pair of points is located forward of the third pair of points; and
   b) the third pair of points is located forward of the second pair of points, and the second pair of points is located forward of the first pair of points.

11. A subframe mount structure according to claim 9, wherein the first pair of points is located between the second and third pairs of points in the front/rear direction of the vehicle body, and wherein the pairs of points are arranged according to one of the following:
   a) the second pair of points is located forward of the first pair of points, and the first pair of points is located forward of the third pair of points; and
   b) the third pair of points is located forward of the first pair of points, and the first pair of points is located forward of the second pair of points.

12. A subframe mount structure according to claim 5, wherein the mounts at the first pair of points each include said internal tube, said external tube and said elastic body; and wherein the mounts at the second pair of points each include said first member and second member and said elastic body.

13. A subframe mount structure according to claim 5, wherein the mounts at the first pair of the points each have a fracture stress upon crash greater than that which the mounts at the second pair of the points have.

14. A subframe mount structure according to claim 5, further comprising mounts at a third pair of points located on both sides in lateral directions of the subframe, wherein the mounts at the third pair of points each include an internal tube arranged in an orientation such that an axis thereof extends in a vertical direction and fastened with a bolt to the vehicle body, an external tube enclosing the internal tube and attached to the subframe, and an elastic body provided in a space between the internal tube and the external tube.

15. A subframe mount structure according to claim 14, wherein the second pair of points is located between the first and third pairs of points in the front/rear direction of the vehicle body, and wherein the pairs of points are arranged according to one of the following:
   a) the first pair of points is located forward of the second pair of points, and the second pair of points is located forward of the third pair of points; and
   b) the third pair of points is located forward of the second pair of points, and the second pair of points is located forward of the first pair of points.

16. A subframe mount structure according to claim 14, wherein the first pair of points is located between the second and third pairs of points in the front/rear direction of the vehicle body, and wherein the pairs of points are arranged according to one of the following:
   a) the second pair of points is located forward of the first pair of points, and the first pair of points is located forward of the third pair of points; and
   b) the third pair of points is located forward of the first pair of points, and the first pair of points is located forward of the second pair of points.

17. A subframe mount structure according to claim 14, wherein the bolt is disengageable out of the bolt hole through the cutaway portion in one of vertical and horizontal directions.

18. A subframe mount structure according to claim 3, wherein one of the first and second members includes a generally planar structure, the other of the first and second members includes a generally L-shaped structure, and the elastic body of the mounts at the points located on both sides in lateral directions of another portion of the subframe is coupled between the first and second members.

19. A subframe mount structure according to claim 18, wherein the elastic body of the mounts at the points located on both sides in lateral directions of another portion of the subframe is disengageably from either the first or second member upon crash.

* * * * *